United States Patent
Dhayni

(10) Patent No.: US 9,191,042 B2
(45) Date of Patent: Nov. 17, 2015

(54) INTERFERENCE CANCELLATION TECHNIQUE FOR CHANNEL ESTIMATION IN OFDM RECEIVERS

(71) Applicant: ST-Ericsson SA, Plan-les-Ouates (CH)

(72) Inventor: Achraf Dhayni, Vallauris (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/030,305

(22) Filed: Sep. 18, 2013

(65) Prior Publication Data

US 2014/0086362 A1    Mar. 27, 2014

(30) Foreign Application Priority Data

Sep. 24, 2012  (EP) ..................... 12306152
Jul. 5, 2013  (EP) ..................... 13175259

(51) Int. Cl.
*H04B 14/06* (2006.01)
*H04B 1/10* (2006.01)
*H04L 27/26* (2006.01)
*H04L 25/02* (2006.01)

(52) U.S. Cl.
CPC .............. *H04B 1/10* (2013.01); *H04L 25/0202* (2013.01); *H04L 27/2647* (2013.01); *H04L 27/2649* (2013.01); *H04L 27/2691* (2013.01); *H04L 25/0204* (2013.01); *H04L 25/0226* (2013.01)

(58) Field of Classification Search
CPC ............ H04L 27/2691; H04L 27/2649; H04L 25/0202; H04L 27/2647; H04B 1/10
USPC .................................................. 375/329, 346
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 7,324,437 | B1 | 1/2008 | Czylwik et al. | |
| 8,411,772 | B2 * | 4/2013 | Wu et al. | 375/260 |
| 8,724,724 | B2 * | 5/2014 | Xin et al. | 375/260 |
| 2002/0181625 | A1 | 12/2002 | Gorokhov et al. | |
| 2004/0247020 | A1 | 12/2004 | Mills et al. | |
| 2005/0174927 | A1 * | 8/2005 | Stephens et al. | 370/206 |
| 2006/0088112 | A1 * | 4/2006 | Das et al. | 375/260 |
| 2007/0009011 | A1 | 1/2007 | Coulson | |
| 2007/0147414 | A1 * | 6/2007 | Niu et al. | 370/465 |
| 2007/0189263 | A1 * | 8/2007 | Izumi et al. | 370/350 |

(Continued)

OTHER PUBLICATIONS

QUALCOMM Europe: "Description and Simulations of Interference Management Technique for OFDMA Based E-UTRA Downlink Evaluation," 3GPP TSG-RAN WG1 #42, R1-050896, Aug. 29-Sep. 2, 2005, London, United Kingdom, entire document.

(Continued)

*Primary Examiner* — Shuwang Liu
*Assistant Examiner* — Helene Tayong
(74) *Attorney, Agent, or Firm* — Patent Portfolio Builders PLLC

(57) ABSTRACT

An interference cancellation technique is implemented in a receiver adapted for determining an estimation of interferences when receiving an OFDM signal made of packets. Each packet includes a first training field, a second training field, a first header field, a second header field and a data field. The receiver detects a first symbol value of the first header field, and a second symbol value of the second header field, the first and the second header fields having been modulated using different modulation schemes. The estimation of interferences is determined using the first and the second symbol values.

13 Claims, 4 Drawing Sheets

(56) References Cited

U.S. PATENT DOCUMENTS

| | | | |
|---|---|---|---|
| 2008/0118012 A1 | 5/2008 | Corke et al. | |
| 2010/0111157 A1* | 5/2010 | Sawai | 375/232 |
| 2011/0194655 A1* | 8/2011 | Sampath et al. | 375/341 |
| 2012/0294294 A1* | 11/2012 | Zhang | 370/338 |
| 2013/0077718 A1* | 3/2013 | Chavali | 375/340 |
| 2013/0107912 A1* | 5/2013 | Ponnampalam | 375/147 |
| 2013/0242970 A1* | 9/2013 | Morioka et al. | 370/338 |
| 2014/0029681 A1* | 1/2014 | Zhang et al. | 375/260 |
| 2014/0140312 A1* | 5/2014 | Lee et al. | 370/329 |

OTHER PUBLICATIONS

Nokia: "Uplink Inter Cell Interference Mitigation and Text Proposal," 3GPP TSG RAN WG1 #44 Meeting, R1-060298, Feb. 13-17, 2006, Denver, CO., USA, entire document.

Samsung: "Flexible Fractional Frequency Reuse Approach," 3GPP TSG RAN WG1 Meeting #43, R1-051341, Nov. 7-11, 2005, Seoul, Korea, entire document.

Ericsson: "Inter-Cell Interference Handling for E-UTRA," TSG-RAN WG1#42, R1-050764, Aug. 29-Sep. 2, 2005, London, United Kingdom, entire document.

Ericsson: "Frequency Hopping for E-UTRA Uplink," TSG-RAN WG1 #46bis, R1-062851, Oct. 9-13, 2006, Seoul Korea, entire document.

Cimini, Jr., Leonard J., et al., "Advanced Cellular Internet Service (ACIS)," Communications Magazine, IEEE, vol. 36, No. 10, pp. 150-159, Oct. 1998, DOI: 10.1109/35.722151.

Bottomley, Gregory E., et al., "Adaptive Arrays and MLSE Equalization," 1995 IEEE 45th Vehicular Technology Conference, vol. 1, pp. 25-28 and 50-54, Jul. 1995, DOI: 10.1109/VETECH.1995.504827.

* cited by examiner

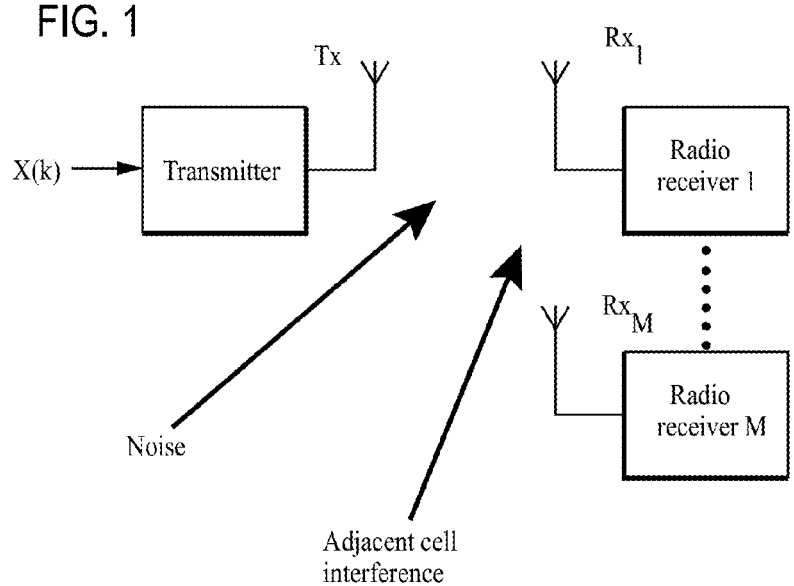
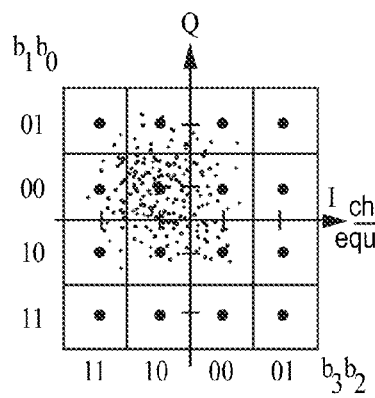
FIG. 2a
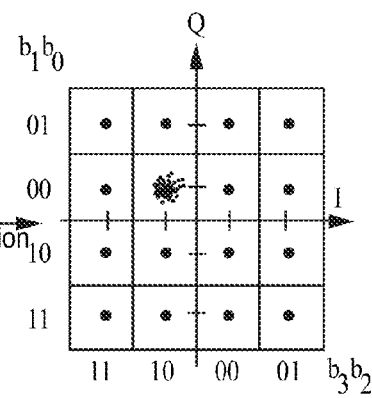
FIG. 2b
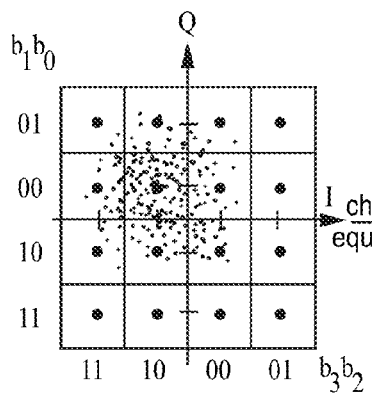
FIG. 2c
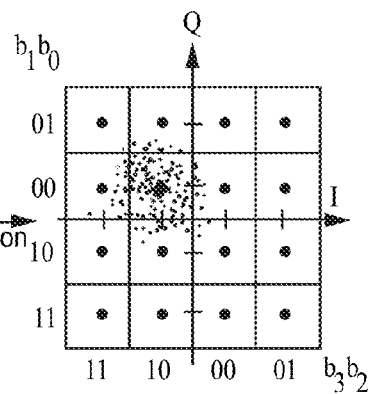
FIG. 2d

INTERFERENCE CANCELLATION TECHNIQUE FOR CHANNEL ESTIMATION IN OFDM RECEIVERS

RELATED APPLICATIONS

This application is related to, and claims priority from, European Patent Application No. 12306152.5, filed on Sep. 24, 2012 and entitled, "Interference Cancellation Technique for Channel Estimation in OFDM Receivers," and European Patent Application No. 13175259.4, filed on Jul. 5, 2013 and entitled, "Interference Cancellation Technique for Channel Estimation in OFDM Receivers," the disclosure of both is incorporated herein by reference.

FIELD OF THE INVENTION

The invention relates to the field of multicarrier communications systems and more particularly to Orthogonal Frequency-Division Multiplexing (OFDM) systems, including wireless OFDM systems.

BACKGROUND OF THE INVENTION

Orthogonal Frequency-Division Multiplexing (OFDM), also referred to as "multicarrier modulation" (MCM) or "discrete multi-tone modulation" (DMTM), splits up and encodes high-speed incoming serial data, modulating it over a plurality of different carrier frequencies (called "subcarriers") within a communication channel to transmit the data from one user to another. The serial information is broken up into a plurality of sub-signals that are transmitted simultaneously over the subcarriers in parallel.

By spacing the subcarrier frequencies at intervals of the frequency of the symbols to transmit, the peak power of each modulated subcarrier lines up exactly with zero power components of the other modulated subcarriers, thereby providing orthogonality (independence and separability) of the individual subcarriers. This allows a good spectral efficiency (close to optimal) and minimal inter-channel interference (ICI), i.e. interferences between the subcarriers.

For these reasons, OFDM is used in many applications. Many digital transmission systems have adopted OFDM as the modulation technique such as digital broadcasting terrestrial TV (DVB-T), digital audio broadcasting (DAB), terrestrial integrated services digital broadcasting (ISDB-T), digital subscriber line (xDSL), WLAN systems, e.g. based on the IEEE 802.11a/g standards, cable TV systems, etc.

However, the advantage of the OFDM can be useful only when the orthogonality is maintained. In case the orthogonality is not sufficiently warranted by any means, the performances of the OFDM system may be degraded due to inter-symbol interference (ISI) and inter-carrier interference (ICI).

OFDM can also be used for OFDM Access system which is a multi-user version of the OFDM. Multiple access is achieved in OFDMA by assigning subset of subcarriers to individual users. This allows simultaneous low data rate transmission from several users.

OFDMA based cellular systems and OFDM WLAN networks suffer from interference, mainly inter-cell interference at the cell boundary, especially when all frequency channels are fully reused.

In other words, some means of mitigating the inter-cell interference (ICI) is required to support a full frequency-reuse operation. According to standards and literature, the inter-cell interference mitigation techniques include inter-cell interference coordination technique, inter-cell interference randomization and inter-cell interference cancellation technique which is better known as the interference rejection combining (IRC) technique, which takes advantage of the interference statistics (correlation property of co-channel interference) received at multiple antennas.

The inter-cell interference coordination technique or the inter-cell interference randomization technique can contribute in decreasing the inter-cell interference (ICI) but can never cancel it totally. Furthermore, it cannot decrease other kinds of interferences. Inter-cell interference cancellation is however the final desired solution.

Existing cancellation techniques are only applicable in a multi-receiving antennas OFDM receivers and they are very complex in terms of implementation especially if the interference cancellation must be accomplished at the moment (or before) of the starting of channel estimation. Knowing that interference is very harmful to channel estimation, from where the interest of canceling the interference before starting the channel estimation.

FIG. 1 shows a clarification of the meaning of interference in the situation of inter-cell interference. Other types of interferences may also occur.

Noise and interferences are added to the transmitted signal during its transmission over the air.

In the FIG. 1, M receivers are depicted, each having an antenna $Rx_1, \ldots Rx_M$. $Hi[k]$ and $Zi[k]$ represents respectively the channel gain and additive noise/interference for the $k^{th}$ subcarrier (k represents the discrete frequency domain) of the $i^{th}$ receiver.

For the transmitted signal $X[k]$, the received signal by the $i^{th}$ receiver is expressed as:

$$Y_i[k]=H_i[k]X[k]+Z_i[k]$$

K=[0, N−1], where N is the number of subcarriers.
In the case of WLAN 802.11a, N=64.

According to this equation, the received OFDM symbol subcarrier $Yi[k]$ is impacted by the interference $Zi[k]$. In general, during the preamble, the received OFDM symbol $Yi[k]$ is used by the channel estimation block of the receiver. If $Yi[k]$ is corrupted only by noise (random signal with known distribution), the channel estimator can handle this situation because it is an estimator. However, if $Yi[k]$ is corrupted by interference as well, the interference is not known to the estimator and thus estimation error will occur. When the channel estimation is faulty due to the interference, the channel equalization during data detection will be faulty as well.

FIGS. 2a, 2b, 2c, 2d show an example of WLAN IEEE 802.11a with 16QAM modulation scheme.

The FIGS. 2a and 2c represent the situation before channel equalization. The FIGS. 2b and 2d represent the situation after channel equalization.

The FIGS. 2a and 2b represent a situation where only noise occurs.

The FIGS. 2c and 2d represent a situation where some interference occurs.

In the FIG. 2c, we can see the channel equalization is successful, whereas in the FIG. 2d, the channel equalization leads to an insufficient result. The interference in the received signal led to a number of false symbol decisions. Increasing the power of the multicarrier interference signal increases the spread of the constellation and leads to a further degradation in the symbol error probability.

FIG. 3 shows interference scenarios. Scenarios 1 and 4 are narrow-band scenarios. Scenario 3 is a wide-band scenario. Scenario 2 is in between.

The invention proposes a new method to cancel or dramatically reduce the interferences that the OFDM receiver receives during channel estimation. This method is very simple and efficient.

SUMMARY OF THE INVENTION

This is achieved with a method for determining an estimation of interferences when receiving an OFDM signal made of packets, each packet comprising at least one training field (STF, LTF), at least two header fields (SIG, HT-SIG, HT-STF, HT-LTF, VHTSIG1, VHTSIG2, VHTSTF, VHTLTF, VHTSIG) and data field, comprising:
- detecting a first symbol value of a first header fields and a second symbol value of a second header field, said first and second header fields belonging to said at least two header fields and the modulation scheme being different between said first and second header fields;
- Determining said estimation from said first and second symbol values.

According to embodiments of the invention the method may comprise one or several of the following features, taken alone or in partial or full combinations:
- said modulation scheme beholds to a group comprising BPSK and QBPSK;
- determining said estimation consists in solving a system of two linear equations, wherein re_int and im_int are respectively the real part and the imaginary part of said estimation:

$$\begin{cases} D1 = \pm 1 + \text{re\_int} + j \cdot \text{im\_int} \\ D2 = \pm j + \text{re\_int} + j \cdot \text{im\_int} \end{cases}$$

said estimation is determined for each subcarriers of said OFDM signal;
said first and second header fields are selected among said at least two header fields according to the modulation mode of said OFDM signal;
when said modulation mode is HT-GT, said first symbol value D1 is stored and compensated by estimations for CFO, SFO, time recovery and channel equalization when they are established.

Another aspect of the invention relates to a method of receiving an OFDM signal consisting in estimating interferences within said OFDM signal according to the previous method, and correcting said signal by cancelling interferences according to said estimation.

Another aspect of the invention relates to a computer program comprising program instructions and being loadable into a data processing unit and adapted to cause execution of the method according to any of previous claims when the computer program is run by the data processing unit.

Another aspect of the invention relates to a receiver adapted for determining an estimation of interferences when receiving an OFDM signal made of packets, each packet comprising a first training field (STF), a second training field (LTF), at least two header fields (SIG, HT-SIG, HT-STF, HT-LTF, VHTSIG1, VHTSIG2, VHTSTF, VHTLTF, VHTSIG) and data field, comprising:
- Means for detecting a first symbol value of a first header fields and a second symbol value of a second header field, said first and second header fields belonging to said at least two header fields and the modulation scheme being different between said first and second header fields;
- Means for determining said estimation from said first and second symbol values.

According to embodiments of the invention the method may comprise one or several of the following features, taken alone or in partial or full combinations:
- Said modulation scheme beholds to a group comprising BPSK and QBPSK.
- said means for determining said estimation is adapted to solve a system of two linear equations, wherein re_int and im_int are respectively the real part and the imaginary part of said estimation:

$$\begin{cases} D1 = \pm 1 + \text{re\_int} + j \cdot \text{im\_int} \\ D2 = \pm j + \text{re\_int} + j \cdot \text{im\_int} \end{cases}$$

said estimation is determined for each subcarriers of said OFDM signal.
means for detecting selects said first and second header fields among said at least two header fields according to the modulation mode of said OFDM signal.
when said modulation mode is HT-GT, said means for detecting stores said first symbol value and compensates it by estimations for CFO, SFO, time recovery and channel equalization when they are established.
Said receivers further comprise means for correcting said signal by cancelling interferences according to said estimation.

BRIEF DESCRIPTION OF THE DRAWINGS

FIG. 1 illustrates a simplified and high-level schema of an OFDMA network.

FIGS. 2a, 2b, 2c, 2d show an example of WLAN IEEE 802.11a with 16QAM modulation scheme.

DETAILED DESCRIPTION OF EMBODIMENTS OF THE INVENTION

Figure 6:
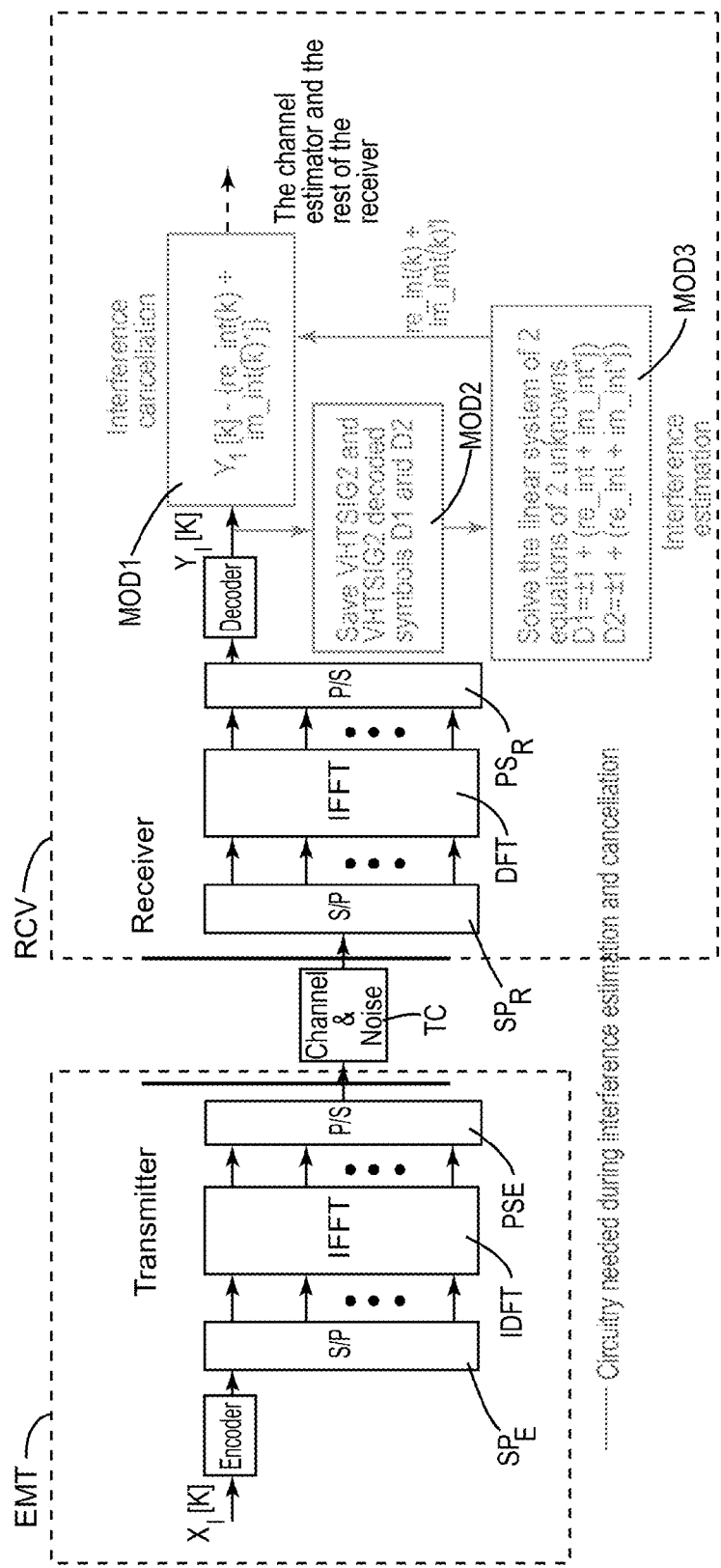
FIG. 6 illustrates a simplified and high-level block diagram of an OFDM system

FIG. 6 illustrates a simplified and high-level block diagram of an OFDM system comprising an emitter EMT and a receiver RCV connected by a communication channel TC. This communication channel is usually (but not necessarily) wireless and perturbed by noise.

The principle of this OFDM system consists in transmitting several symbols (or signal) in parallel by assigning to each of them a different carrier, each carrier being orthogonal to the others. The number of carriers (or subcarriers) depends on the total bandwidth and on the duration of a symbol (i.e. the size of the time window in which the receiver can capture the transmitted symbols).

The symbols to be transmitted, initially in the frequency domain, are transposed into the time domain and modulated for transmission over the communication channel TC. The receiver RCV transposes the received signals back to the frequency domain to extract the transmitted symbols.

More precisely, the symbols $X_i[k]$ to be transmitted at emitter EMT side are first appropriately encoded and then sent to a serial-to-parallel transformer $SP_E$. This function blocks aims in extracting from a symbol, a number N of individual values $X_l[k]$, where "k" ranges from 1 to N−1 and "l" represents the ordinal number of the OFDM symbol to be transmitted.

This number N is equal to the number of subcarriers used for the transmission over the communication channel TC. It depends on the standard. For instance according to WLAN 802.11a, 52 subcarriers are used (48 data subcarriers+4 pilot subcarriers), and 12 (6 on the "left" and 6 on the "right") subcarriers are not used (zero subcarriers).

Here and in the following descriptions, the variable k will be used for the frequency domain and the variable n for time domain.

The symbols $X_l[k]$ which are outputted by the serial-to-parallel transformer $SP_E$ are provided to a frequency-to-time conversion module IDFT. This frequency-to-time convertor can perform an inverse discrete Fourier Transform of the symbols $X_l[k]$ to generate symbols $x_l[n]$ in the time domain. It is often implemented by an inverse Fast Fourier Transform (I-FFT).

These symbols $x_l[n]$ are then multiplexed by the parallel-to-serial transformer $PS_E$ to produce a signal transmitted over the transmitted channel TC.

The transmitted channel can be associated with a transfer function $h_l(n)/H_l(k)$. It represents the channel multipath behavior, delay, and complex attenuation. The transfer function may vary over time and is therefore indexed by the number of the transmitted symbol.

The multiplexer $PS_E$ modulates the orthogonal subcarriers by the symbols to be transmitted.

The transmitted OFDM symbol $x_1(n)$ signal spectrum is the sum in the frequency domain of the orthogonal subcarrier sinc functions that are superposed over each other. The individual symbols can be independently modulated by using different types of modulations techniques, like for instance QAM (Quadrature Amplitude Modulation) or PSK (Phase-Shift Keying).

The symbols $y_l(n)$ are received by the receiver RCV.

The receiver RCV comprises a receiving function module RFM which generates demodulated symbols Yl[k] from the received symbols stream yl[n]. The demodulated symbols can then be passed over to other circuitry of the receiver RCV (not depicted).

The receiving function module RFM may perform different steps which are usual in OFDM systems but may be subject to variations and different implementations.

The high-level schema of the FIG. 1 shows a possible implementation where the receiving function module RFM comprises:
a serial-to-parallel transformer or demultiplexer $SP_R$, which parallelizes the received symbol to a set of time symbols $y_l(n)$.
A time-to-frequency conversion module DFT. This convertor can perform a discrete Fourier Transform of the time symbols $y_l(n)$ to generate a set of received frequency bins $Y_l(k)$ in the frequency domain, corresponding to determined subcarriers.
A parallel-to-serial transformer $PS_R$ to produce symbols $Y_l(k)$ made of these received frequency bins $Y_l(k)$. These symbols can then be transmitted to other circuitries of the receiver RCV (not depicted in the figure).

In order to perform these steps, the receiving function module RFM shares with the emitter EMT the same subcarriers frequencies, as well as the number of subcarriers N. They could have been communicated beforehand, or they may be set or tuned previously in both the emitter and receiver, for instance according to standards specifications.

However, the received symbols may have been perturbed during the transmission over the transmission channel TC.

According to the invention, some estimation steps are performed so as to avoid interferences during the channel estimation. The result of these estimation steps can for instance be used according to various implementations of the state for art.

Figure 4:
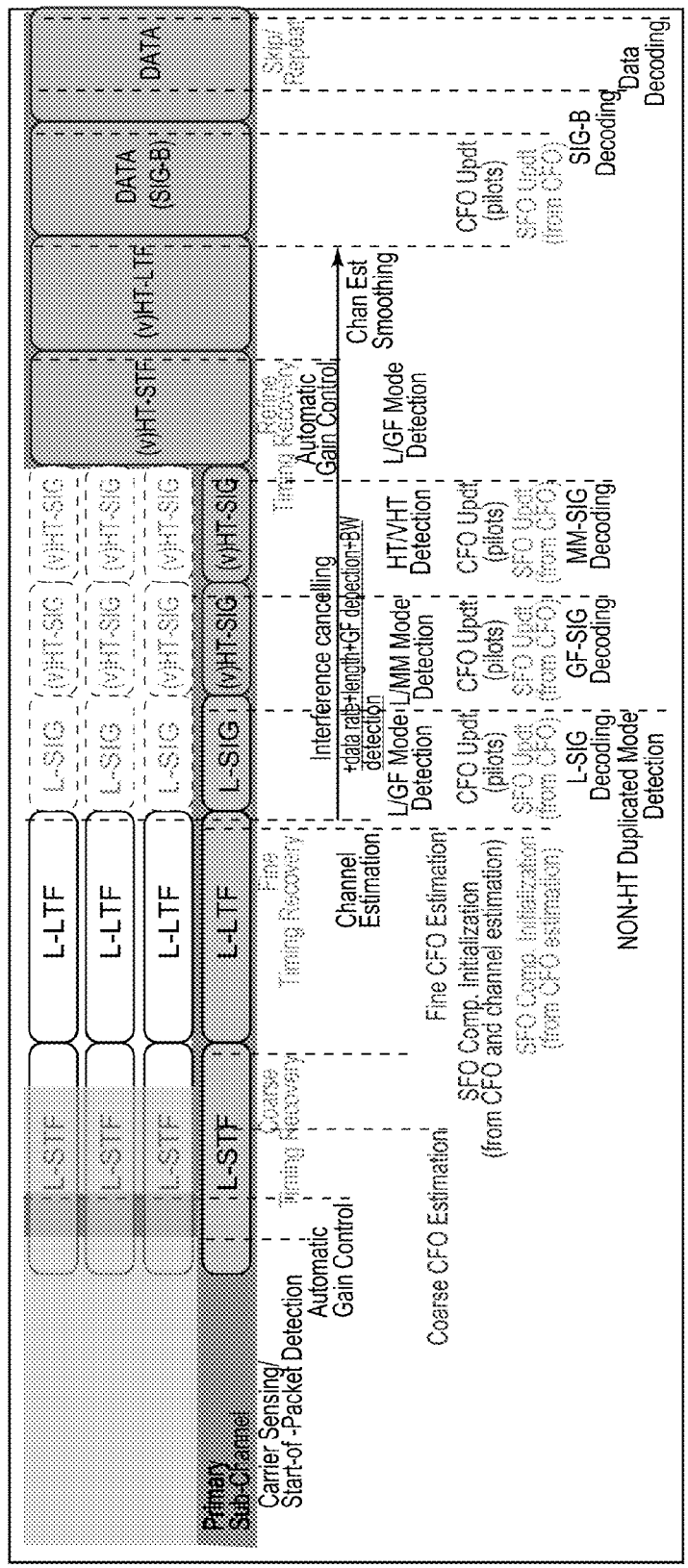
FIG. 4 illustrates the adjusting operations of a receiver in a WLAN 802.11 based implementation.

When the WLAN IEEE 802.11 OFDM receiver detects a start-of-packet, it starts adjusting itself in order to be ready to receive the data. As shown in FIG. 4, there are a lot of receiver adjusting operations; one of them is the channel estimation that must be accomplished at the end of the L-LTF part of the preamble.

The preamble starts with L-STF and ends just before the beginning of DATA.

This preamble is made of a short training field (STF or L-STF), a long training field (LTF or L-LTF) and some header fields: SIG (for signal) field, HT-SIG, HT-STF, HT-LTF, VHTSIG1, VHTSIG2, VHTSTF, VHTLTF, HFTSIG). The presence and number of header fields depend on the format of modulation mode as it will be explained later.

During the preamble the receiver must adjust itself to receive DATA field. Notice that the channel estimation must be coarsely done by the end of the L-LTF in order to receive the low rate (low order modulation scheme: BPSK) information in SIG; that means that the interference is still tolerated while receiving SIG.

However we can notice that the fine channel estimation (called channel smoothing) must be accomplished before the start of the high rate DATA reception (higher order modulation scheme), here, channel estimation errors due to interference are not tolerated anymore. For this reason, the invention proposes to cancel the interference in the time between "channel estimation" and "channel smoothing" as depicted by the bold arrow in the middle of the FIG. 4, in such a way, the interference is canceled to enhance "channel smoothing'.

According to an embodiment based on WLAN IEEE 802.11 standard, different SIG filed symbol modulations exist. This is for "modulation detection" purposes.

Figure 3:
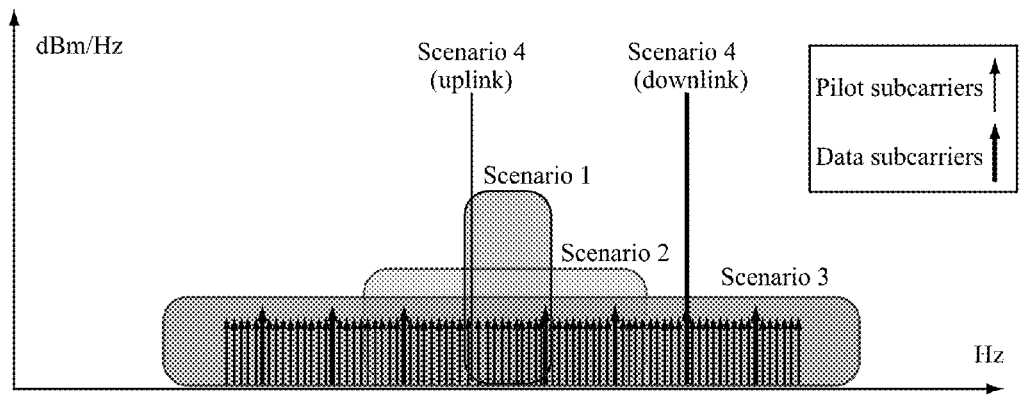
FIG. 3 illustrates different interference scenarios.
Figure 5:
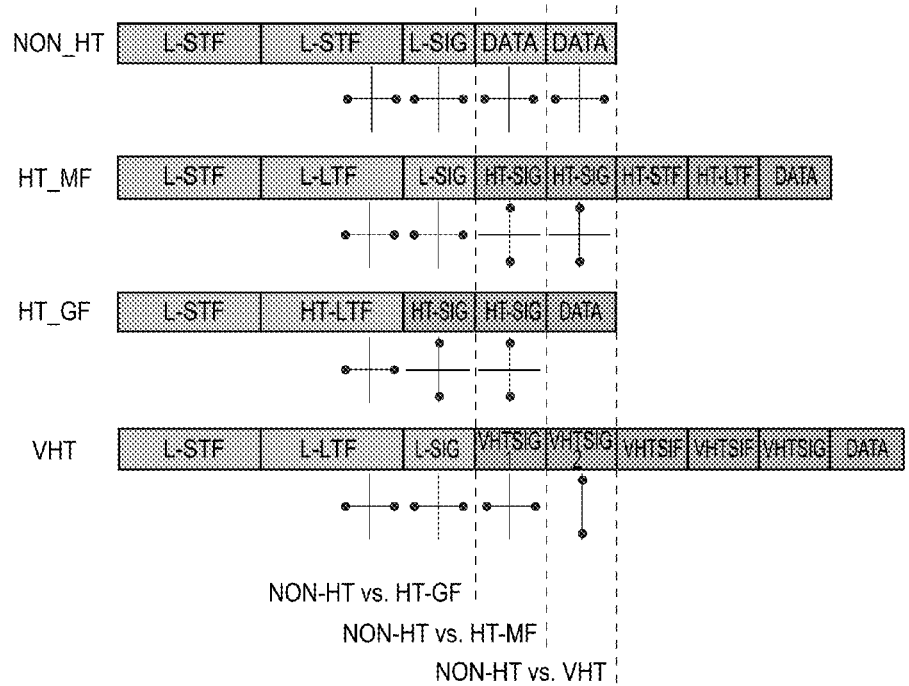
FIG. 5 illustrates different symbol modulations according to WLAN 802.11 standard.

These are depicted in FIG. 5, wherein:
NON-HT stands for non high throughput;
HT: high throughput;
VHT: very high throughput.

These different modulation modes have been introduced over time into the 802.11 OFDM standard.

The format for the Non-HT mode comprises STF, LTF and SIG header fields, usually named L-STF, L-LTF and L-SIG, with "L" standing for "legacy" as it corresponds to the original 802.11a/g OFDM standard. They are transmitted first in OFDM packet of most other modulation modes for backward compatibility.

The HT-MF (mixed format) mode introduces other header fields: HT-SIG, HT-SIG, HT-STF and HT-LTF. The L-STF, L-LTF and L-SIG are similar to those of the non-HT mode.

The HT-GF (greenfield format) is similar to the HT-MF mode but the L-LTF field is removed. The packets thus comprise a single training field (L-STF) and header fields (HT-LTF, HT-SIG, HT-SIG) and data (DATA) field.

The VHT mode comprises L-STF and L-LTF training fields and header fields (L-SIG, VHTSIG1, VHTSIG2, VHTSTF, VHTLTF, VHTSIG) and data field.

The concept of "header field" has no particular technical meaning as nothing distinguishes the so-called header field from the training field. However this naming is convenient for the purpose of clarifying the invention. Header fields can thus be considered as fields sitting between the legacy training fields and the Data field.

Except for a small mitigation relating to the HT-GF mode that will be explained later, the beginning of the header field corresponds to a time at which a coarse channel estimation has been achieved.

Different SIG filed symbol modulations exist in order to give the receiver the capability of understanding the type of packet that it is receiving.

FIG. 5 also depicts the modulation scheme used for some of the packet fields in the different modulation mode. The modulation scheme may be BPSK or QBPSK The BPSK (Binary Phase-Shift Keying) or 2-PSK consists in modulating the phase in a binary mode: the 2 binary values are opposite by 180° and the symbol is either equal to +1 or to −1. The Q-BPSK is a similar scheme but rotated by 90°: the symbol is thus equal to +j or −j, where j is the imaginary unit.

Determining the modulation schemes for several fields allows determining in which modulation mode the receiver RCV is receiving and how it should then adjust itself.

When the receiver detects only BPSK (depicted by a horizontal line joining two points) then it knows that it must adjust itself to receive NON-HT packets.

When the receiver detects BPSK (depicted by a horizontal line joining two points) in the L-LTF and L-SIG and QBPSK (depicted by a vertical line joining two points) in the HT-SIG, then it knows that it must adjust itself to receive HT-MF packets.

When the receiver detects BPSK (depicted by a horizontal line joining two points) in the HT-LTF and QBPSK (depicted by a vertical line joining two points) in the HT-SIG, then it knows that it must adjust itself to receive HT-GF packets.

When the receiver detects BPSK (depicted by a horizontal line joining two points) in the L-LTF and L-SIG and VHTSIG-1, and QBPSK (depicted by a vertical line joining two points) in the VHTSIG-2, then it knows that it must adjust itself to receive VHT packets.

The idea of this invention is to make benefit of the above presented BPSK/QBPSK variation for the purpose of interference estimation and cancellation. In the NON-HT case (where no BPSK/QBPSK variation) we do not care about interference cancellation because it is a low-rate mode where the interference-caused channel estimation error can be tolerated.

In other modulation modes, a selection is done between the available header fields for determining two header fields corresponding to two different modulation schemes.

In HT-MF mode, the selected header fields can therefore be L-SIG and HT-SIG, corresponding respectively to BPSK and QBPSK modulation schemes.

In HT-GF mode, the selected header fields can be HT-LTF and HT-SIG

In VHT mode, the selected header fields can be VHTSIG1 and VHTSIG2.

An estimation of the interference can then be computed from the BPSK/QBPSK variation.

First, symbol values D1, D2 are detected in each of the selected header fields, by the means MOD 2 depicted in FIG. 6.

Then, from these two symbol values, D1, D2, some means MOD 3 are adapted to determine an estimation of the interferences.

According to the modulation scheme, the receiver knows the symbol emitted by the emitter EMT. The difference between this symbol and the detected symbol value correspond to the interferences. The interference can be represented as a complex value (re_int, im_int), wherein re_int and im_int represent respectively the real and imaginary part of the interferences.

Therefore, an estimation for these interferences can be determined by solving the following system of two linear equations:

$$\begin{cases} D1 = \pm a + \text{re\_int} + j \cdot \text{im\_int} \\ D2 = \pm b + \text{re\_int} + j \cdot \text{im\_int} \end{cases}$$

a, b represent 1 or j, depending on the modulation scheme. For the system to be solvable, we should have a≠b. This is why the selected header fields should correspond to different modulation schemes.

According to an embodiment of the invention, the interferences re_int(k), im_int(k) are determined for each of the subcarriers k of the OFDM signal.

The method of the invention will be further explained for the VHT modulation. In this example of the VHT modulation, this estimation can be computed by the following steps:

1. While receiving the BPSK OFDM symbol of VHTSIG-1, at each subcarrier k (at the output of the FFT block) we will be detecting a symbol value D1. This symbol value is equal to ±1+(re_int(k)+im_int(k)*j), where re_int(k) and im_int(k) are the real and imaginary parts of the interference at the subcarrier k. This interference is what we want to estimate for all values of k. "±1" represents the BPSK transmitted sample that can be either 1 (when a logic 1 is sent) or −1 (when a logic 0 is sent).
   This step can be performed by a functional module MOD 2, as depicted in the FIG. 6.

2. While receiving the QBPSK OFDM symbol of VHTSIG-2, we will be detecting a symbol value D2 equal to ±j+(re_int(k)+im_int(k)*j). "±j" represents the QBPSK transmitted sample that can be either +j (when a logical "1" bit is sent) or −j (when a logical "0" bit is sent). This step is also performed for each subcarriers k.
   This step can be performed by a functional module MOD 2, as depicted in the FIG. 6.

3. As a result we have a system of two linear equations of two unknowns that we can easily solve to estimate the interference (re_int(k)+im_int(k)*j):

$$\begin{cases} D1 = \pm 1 + \text{re\_int} + j \cdot \text{im\_int} \\ D2 = \pm j + \text{re\_int} + j \cdot \text{im\_int} \end{cases}$$

In this system, more precisely, the emitted values (1, −1, j, −j) are known and the received values D1, D2 are detected, so that the only unknowns are re_int and im_int.

This step can be performed by a module MOD 3.

As it has been mentioned earlier, the modulation mode HT_GF may needs further refinement.

The first selected header field is the HT-LTF, as it is the only header field corresponding to BPSK modulation scheme.

However, as depicted on FIG. 4, the coarse CFO (Carrier Frequency Offset) and SFO (Sampling Frequency Offset), timing recovery and channel transfer function should be estimated before starting the interference estimation/cancelling process. These 4 estimations are only terminated near the end of the transmission of the LTF field.

According to the invention, the values D1 of the HT-LTF field are stored and, when the 4 estimations are achieved, they are used to compensate for the value D1. This corrected and compensated value D1 can then be used by the means MOD 2 and introduced in the equations to be solved to determine an estimation of the interference.

By doing this, the used values D1 (and D2 as well) are freed from channel and synchronization errors, for a clean interference estimation.

According to an embodiment of the invention, after the estimation of the interference, it can be subtracted from the subcarrier k of VHTSIG-1 and VHTSIG-2 symbols in order to cancel interferences before doing the fine channel estimation. This has to be done for all values of k.

This step can be performed by a functional module MOD 1, as depicted in the FIG. 6. These means takes as inputs both the received symbols and the estimation and produce a corrected version of the received symbols wherein the interferences have been dramatically reduced.

It should be noted that the means MOD 1, MOD 2, MOD 3 may be implement in various ways. Depicting them as separated as on FIG. 6 is mainly a functional view, useful for clarity purpose, but is not binding for actual implementations.

The functional modules MOD 1, MOD 2 and MOD 3 can be the only addition to the functional architecture of the receiver RCV, according to this embodiment of the invention.

The invention has been described with reference to preferred embodiments; but other embodiments and variations are possible while being within the scope of the claimed invention.

The invention claimed is:

1. A method for determining an estimation of interferences when receiving an Orthogonal Frequency-Division Multiplexing (OFDM) signal made of packets, each packet including at least one training field, at least two header fields and a data field, the method comprising:
    detecting a first symbol value (D1) of a first header field and a second symbol value (D2) of a second header field, said first and second header fields belonging to said at least two header fields, and said first and second header fields having been transmitted after being modulated using different modulation schemes, respectively; and
    determining said estimation of interferences from said first and second symbol values,
    wherein the determining of said estimation consists in solving a system of two linear equations, wherein re_int and im_int are respectively a real part and an imaginary part of said estimation:

$$\begin{cases} D1 = \pm 1 + \text{re\_int} + j \cdot \text{im\_int} \\ D2 = \pm j + \text{re\_int} + j \cdot \text{im\_int} \end{cases}.$$

2. The method according to claim 1, wherein said different modulation schemes are Binary Phase-Shift Keying (BPSK) and Quadrature Binary Phase-Shift Keying (QBPSK).

3. The method according to claim 1, wherein said estimation is determined for each subcarriers of said OFDM signal.

4. The method according to claim 1, wherein said first and second header fields are selected among said at least two header fields according to the modulation mode of said OFDM signal.

5. The method according to claim 1, wherein when said modulation mode is High-Throughput Greenfield Format (HT-GF), said first symbol value D1 is stored and compensated by estimations for Carrier Frequency Offset (CFO), Sampling Frequency Offset (SFO), time recovery and channel equalization when they are established.

6. The method according to claim 1, further comprising correcting said signal by cancelling interferences according to said estimation.

7. A non-transitory computer-readable medium encoded with a computer program comprising program instructions which when loaded into a data processing circuitry cause the data processing circuitry to execute the method according to claim 1.

8. A receiver adapted for determining an estimation of interferences when receiving an Orthogonal Frequency-Division Multiplexing (OFDM) signal made of packets, each packet including a first training field, a second training field, at least two header fields and a data field, the receiver comprising:
    circuitry for detecting a first symbol value of a first header field and a second symbol value of a second header field, said first and second header fields belonging to said at least two header fields and said first and second header fields having been transmitted after being modulated using different modulation schemes, respectively; and
    circuitry for determining said estimation of interferences from said first and second symbol values,
    wherein said circuitry for determining said estimation is adapted to solve a system of two linear equations, wherein re_int and im_int are respectively a real part and an imaginary part of said estimation:

$$\begin{cases} D1 = \pm 1 + \text{re\_int} + j \cdot \text{im\_int} \\ D2 = \pm j + \text{re\_int} + j \cdot \text{im\_int} \end{cases}.$$

9. The receiver according to claim 8, wherein said modulation scheme are Binary Phase-Shift Keying (BPSK) and Quadrature Binary Phase-Shift Keying (QBPSK).

10. The receiver according to claim 8, wherein said estimation is determined for each subcarriers of said OFDM signal.

11. The receiver according to claim 8, wherein circuitry for detecting selects said first and second header fields among said at least two header fields according to the modulation mode of said OFDM signal.

12. The receiver according to claim 8, wherein when said modulation mode is High-Throughput Greenfield Format (HT-GF), said circuitry for detecting stores said first symbol value and compensates it by estimations for Carrier Frequency Offset (CFO), Sampling Frequency Offset (SFO), time recovery and channel equalization when they are established.

13. The receiver according to claim 8, further comprising circuitry for correcting said signal by cancelling interferences according to said estimation.

\* \* \* \* \*